J. F. WATTS.
GARBAGE CAN.
APPLICATION FILED JUNE 5, 1916.

1,248,762.

Patented Dec. 4, 1917.

Inventor
Josiah F. Watts
By Fred P. Gorin
Attorney

UNITED STATES PATENT OFFICE.

JOSIAH F. WATTS, OF SEATTLE, WASHINGTON.

GARBAGE-CAN.

1,248,762.

Specification of Letters Patent.

Patented Dec. 4, 1917.

Application filed June 5, 1916. Serial No. 101,741.

*To all whom it may concern:*

Be it known that I, JOSIAH F. WATTS, a citizen of the United States, and a resident of Seattle, in the county of King and State of Washington, have invented certain new and useful Improvements in Garbage-Cans, of which the following is a full, true, and exact specification.

My invention relates to improvements in garbage cans and has for its principal object to provide an improved and novel form of garbage cans which embodies an improved form of cover and a dumping bottom.

Figure 2:
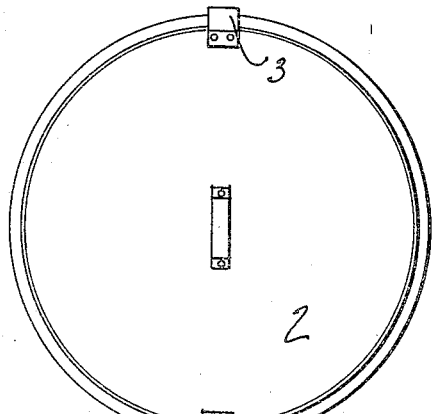
Figure 1:
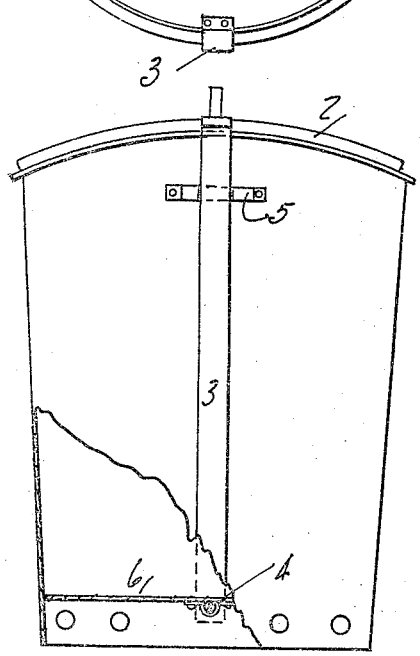
Figure 3:
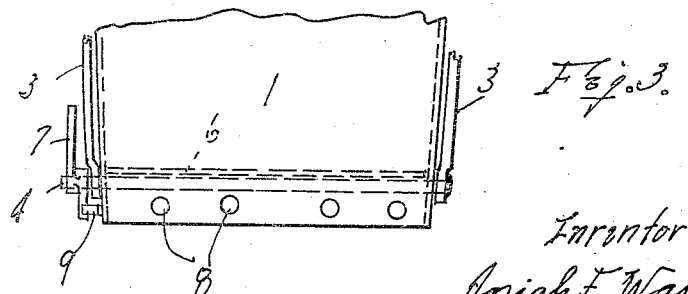

In the drawings, Figure 1 is a side elevation of my device with parts broken away. Fig. 2 is a plan of same. Fig. 3 is a fragmentary front elevation.

Referring more particularly to the drawings, numeral 1 indicates a cylindrical can which is provided with a segmental cover 2 and a corresponding segmental top against which the cover fits snugly. The cover is secured to a yoke 3 which is pivoted to a shaft 4 at the sides of the can 1. To remove the cover, it is only necessary to swing it about the pivot shaft 4. A spring snap 5 normally holds the cover in a closed position. A bottom 6 is secured to shaft 4 which is provided with a handle 7 on the outside of the can 1. Bottom 6 is set a little above the base of can 1 which is provided with vent holes 8 beneath bottom 6 so that the bottom will be kept dry and will not rust. A spring snap 9 normally holds the handles 7 in position so that the bottom is in a closed position. The object in having a cover as shown lies in the fact that the usual garbage can has a loose cover which is easily blown off, lost, etc., and which becomes bent and allows flies to get into the can.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

A garbage can comprising a stationary hollow body portion, a cover for the body portion, a rod extending centrally across the lower portion of the body, arms extending from said cover and pivotally mounted on the ends of the rod, a bottom for the body secured to the rod, a lever attached to the outer end of the rod and provided with a projection, and a catch on the outside of the body portion to engage the lever to hold the bottom in closed position in the body portion, whereby when the catch is released the bottom may be tilted to remove the contents from the body portion.

In testimony whereof I affix my signature.

JOSIAH F. WATTS.

Copies of this patent may be obtained for five cents each, by addressing the "Commissioner of Patents, Washington, D. C."